United States Patent [19]

Rabatic

[11] Patent Number: 4,718,684
[45] Date of Patent: Jan. 12, 1988

[54] FOLDABLE SLED

[76] Inventor: Djordje Rabatic, Aleja Viktora Bubnja Str. No. 55/18, 41000 Zagreb, Yugoslavia

[21] Appl. No.: 868,210

[22] Filed: May 23, 1986

Related U.S. Application Data

[63] Continuation-in-part of Ser. No. 468,191, Feb. 22, 1983, abandoned.

[30] Foreign Application Priority Data

Feb. 24, 1982 [YU] Yugoslavia ............................ 402/82

[51] Int. Cl.$^4$ ............................................. B62B 13/16
[52] U.S. Cl. ..................................... 280/20; 403/391; 297/56; 100/118; 248/164
[58] Field of Search .......... 280/20, 23, 12 A, 47.37 R, 280/15, 24, 649; 403/391, 396, 399, 400, 388, 100; 297/56; 248/164, 431; 108/118; 100/118

[56] References Cited

U.S. PATENT DOCUMENTS

| 278,447 | 5/1883 | Mitchell | 280/20 |
|---|---|---|---|
| 2,105,360 | 1/1938 | Nodland | 280/23 |
| 3,061,326 | 10/1962 | Rasmussen | 280/20 |
| 3,180,652 | 4/1965 | Johansson | 280/20 |
| 3,365,209 | 1/1968 | Fischer | 280/20 |
| 3,839,754 | 10/1974 | Hooper | 248/164 |
| 4,170,367 | 10/1979 | Rickenbacher | 280/20 |
| 4,245,850 | 1/1981 | Boudreau | 280/649 |
| 4,294,457 | 10/1981 | Thiboutot | 280/20 |

Primary Examiner—Richard A. Bertsch
Attorney, Agent, or Firm—Ladas & Parry

[57] ABSTRACT

A foldable sled having two frame members pivotally connected to each other and swinging relative to each other from a sled operative position to a folded position. Handle means are provided on the part used for pushing and holding and a piece of fabric is attached to the handle means for providing a backrest.

4 Claims, 24 Drawing Figures

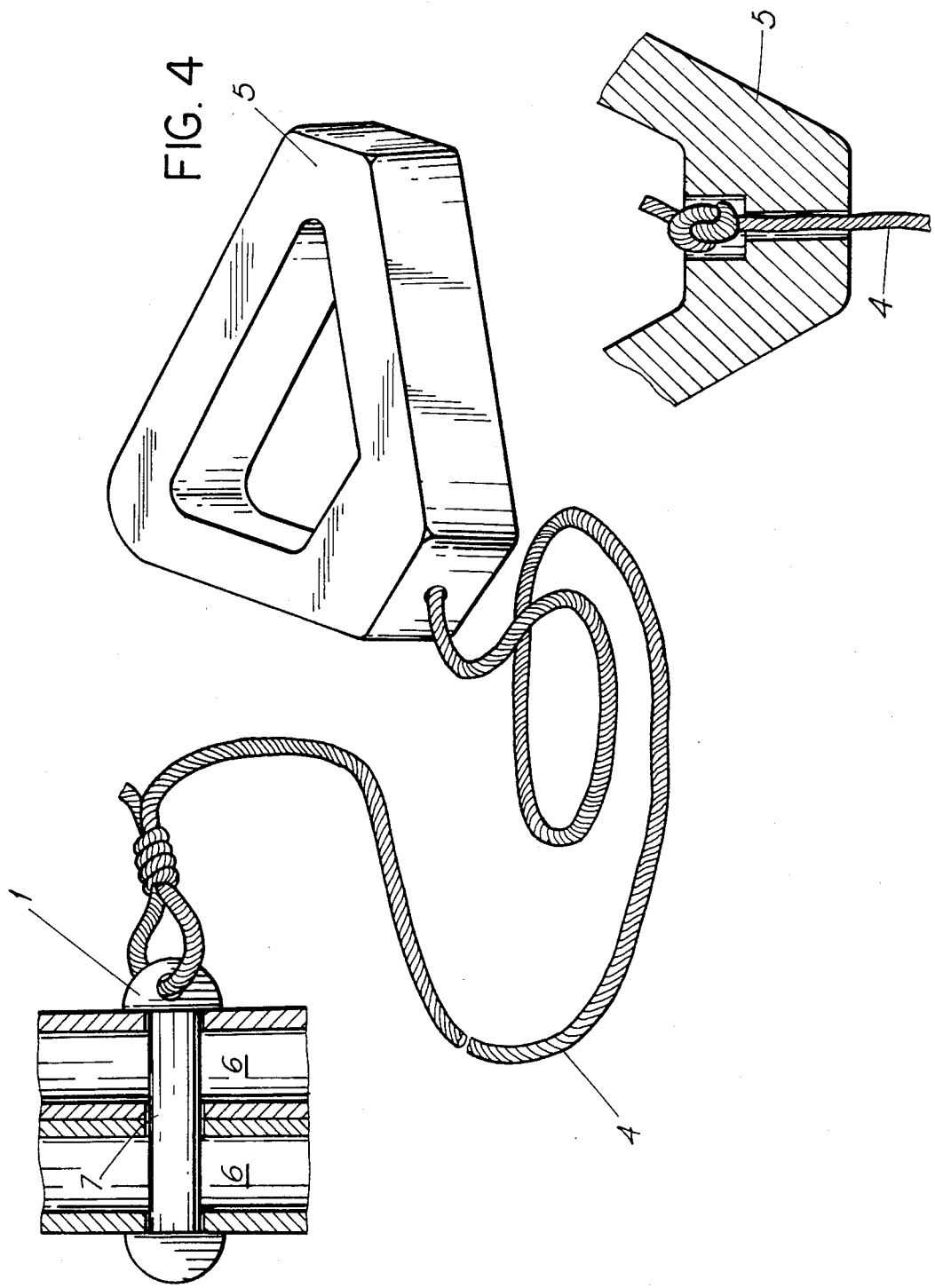

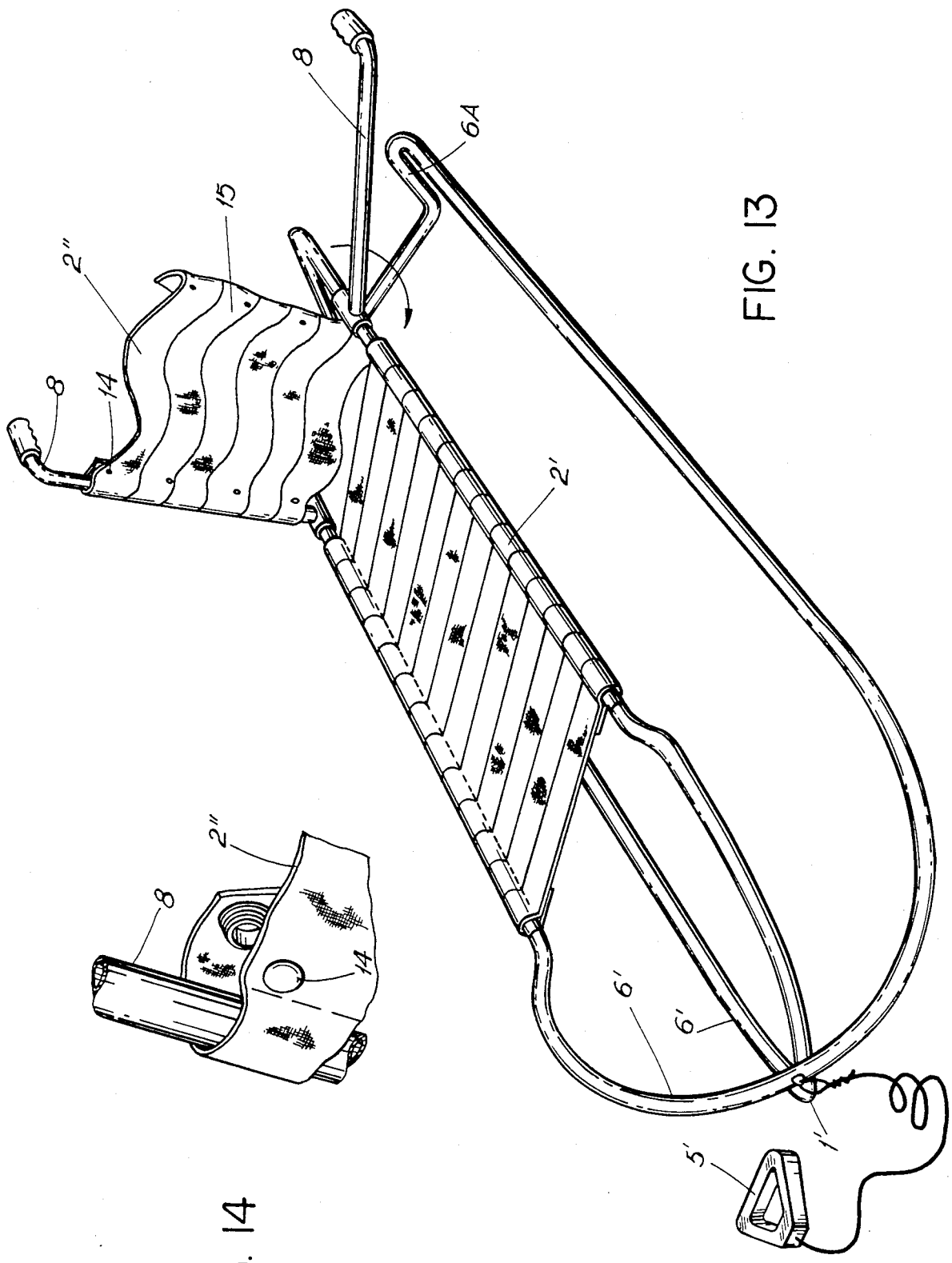

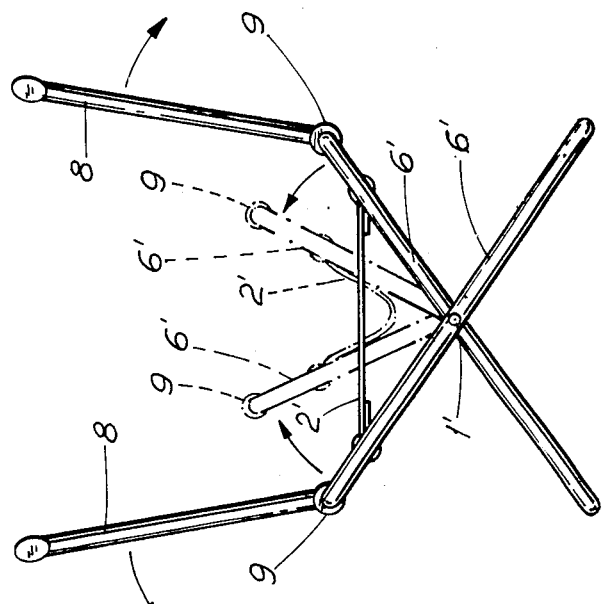
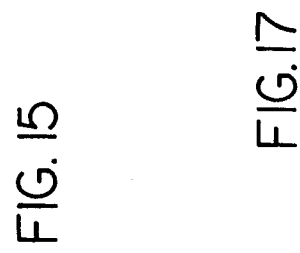
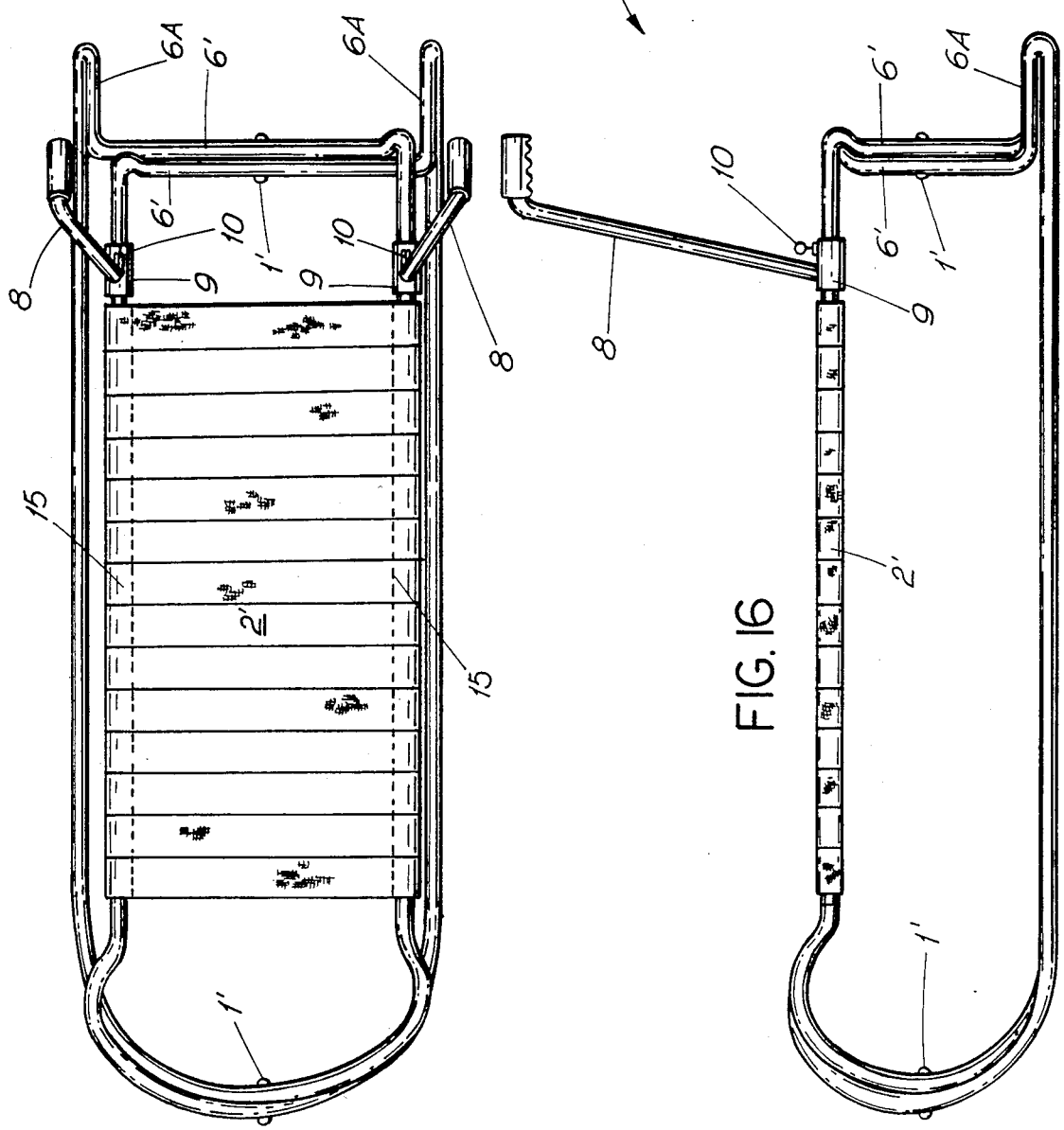

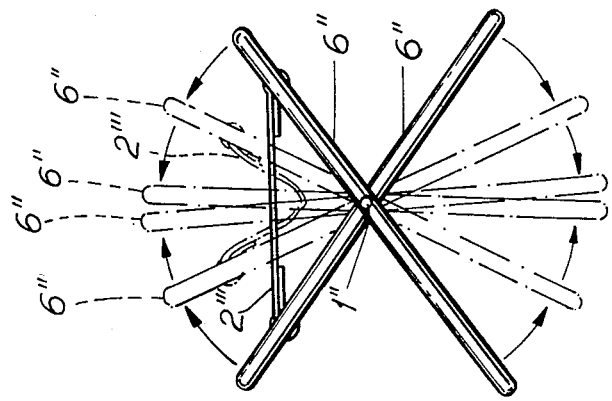
FIG. 21
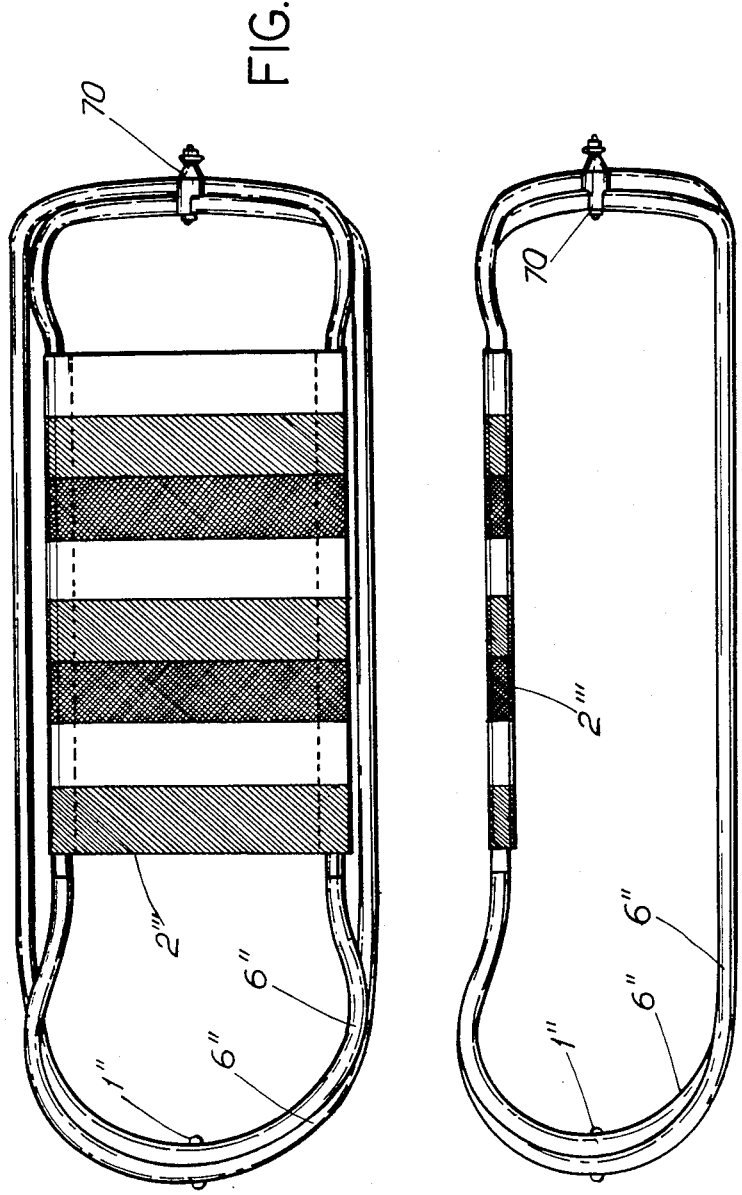
FIG. 19
FIG. 20

FOLDABLE SLED

This is a continuation-in-part of co-pending but now abandoned application Ser. No. 468,191 filed on Feb. 22, 1983.

This invention relates a sled that can be folded, requiring less storage space, and having a lot of advantages compared to known, mostly wooden, sleds.

Besides being practically disasembleable, known sleds have many parts, which makes their price higher. Because of many reinforcements, known sleds are "stiffer" and uncomfortable, even breakable in the case of higher loadings. The greatest disadvantage of the known sleds is in the required storage space, hardly obtainable in a normal apartment. The task of this invention is to eliminate those disadvantages.

Foldable sled according to this invention may consist of two identical frames one inside the other and, around the middle, parallelly connected by rivets, looking horizontally. The distance needed for sitting is defined by the width of fabric which is slipped between the frames.

The foldable sled has only one rope with an anatomically designed handle on its end.

A further embodiment of this invention has raised handles on the back part used for pushing and holding. A fabric is simply stretched over these handles, forming a rest for children.

Besides, this embodiment of foldable sled has projections on the sliding ends, so that one can sleigh standing on those projections and holding the mentioned handles.

As the sled according to this invention has only a few parts, it is very light and the production thereof is cheap.

The foldable sled according to this invention does not have unneeded stiffenings which makes them elastic and comfortable in use.

Because of the small storage space needed, it can be put aside even in the smallest free spaces, for instance, under a bed, in a large drawer and the like.

For the same reason, transport and storage expenditures in production are much smaller compared to the same expenditures with the known sleds.

Looking to the unfolded sled from above, we can see that the front part is made a bit wider, protecting the legs of the driver from unexpected crash against a tree, tree stump and the like.

In a preferred embodiment, this invention relates to a foldable sled having a safety fastener protecting against undesired folding or collapsing of the sled in driving, while jumping etc.

The invention will be described in a greater detail on the basis of the figures showing:

FIG. 4 is side elevation, partly in section, and perspective views, respectively of rivet and rope and handle portions of the sled of FIG. 1;

FIG. 5 is a plan view, partly in section, of a portion of the rope and handle portions of FIG. 4;

FIG. 13 is an overall perspective view of the sled of the sled frame of FIG. 10 with additional fabric;

FIG. 14 is an enlarged, perspective view of a handle detail with the clasp on the fabric of the additional fabric of the sled of FIG. 13;

FIG. 15 is a plan view of a portion of the sled of FIG. 13;

FIG. 16 is a side view of the portion of the sled of FIG. 15;

FIG. 17 is a front view of the portion of the sled of FIG. 15, unfolded and half-folded;

FIG. 19 is a plan view of a portion of the sled of FIG. 18;

FIG. 20 is a side elevation of the portion of the sled of FIG. 19;

FIG. 21 is a front view of the portion of the sled of FIG. 19 in various states of folding;

Figure 1:
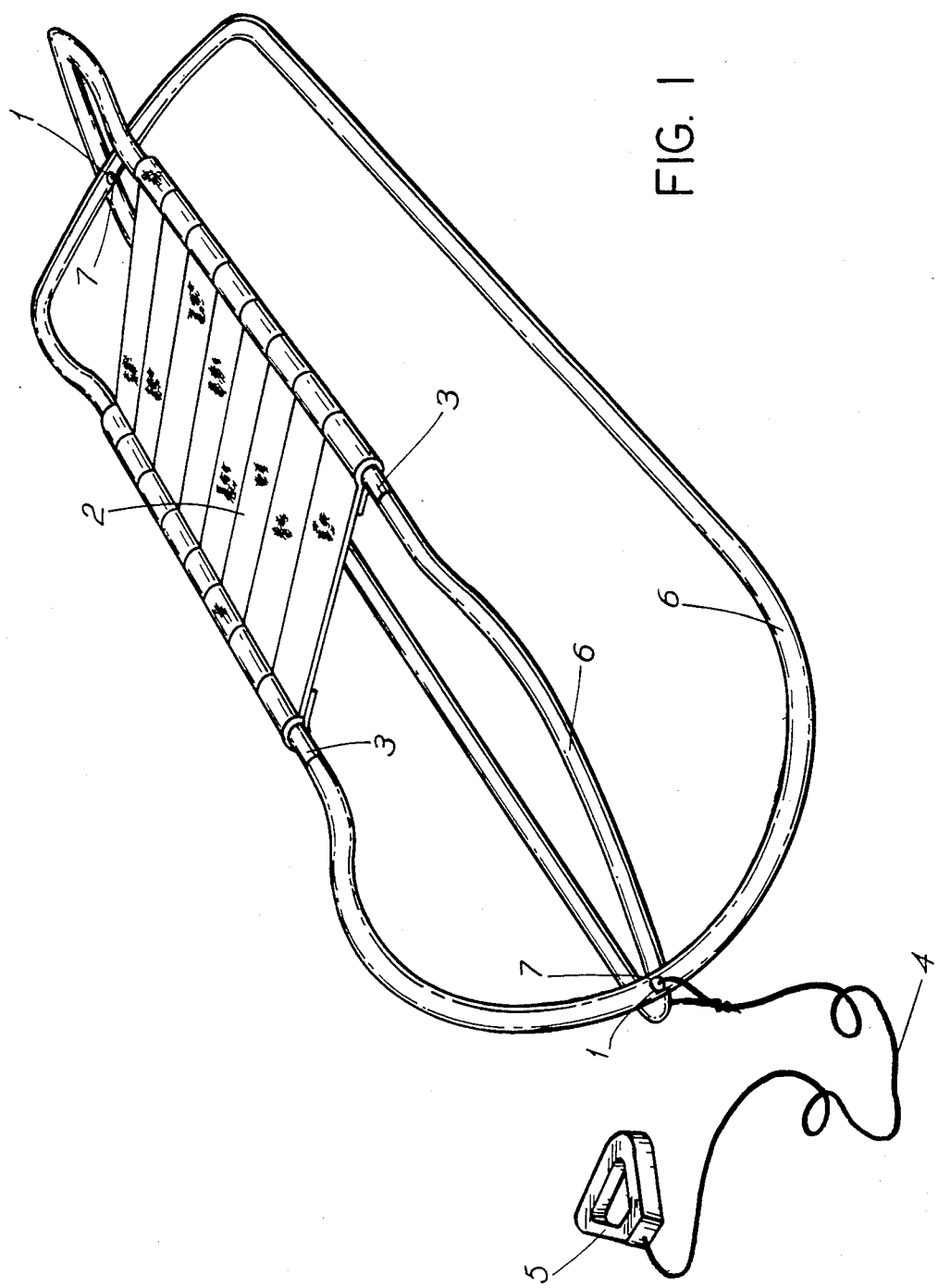
FIG. 1 is a perspective view of one embodiment of a sled.
Figure 18:
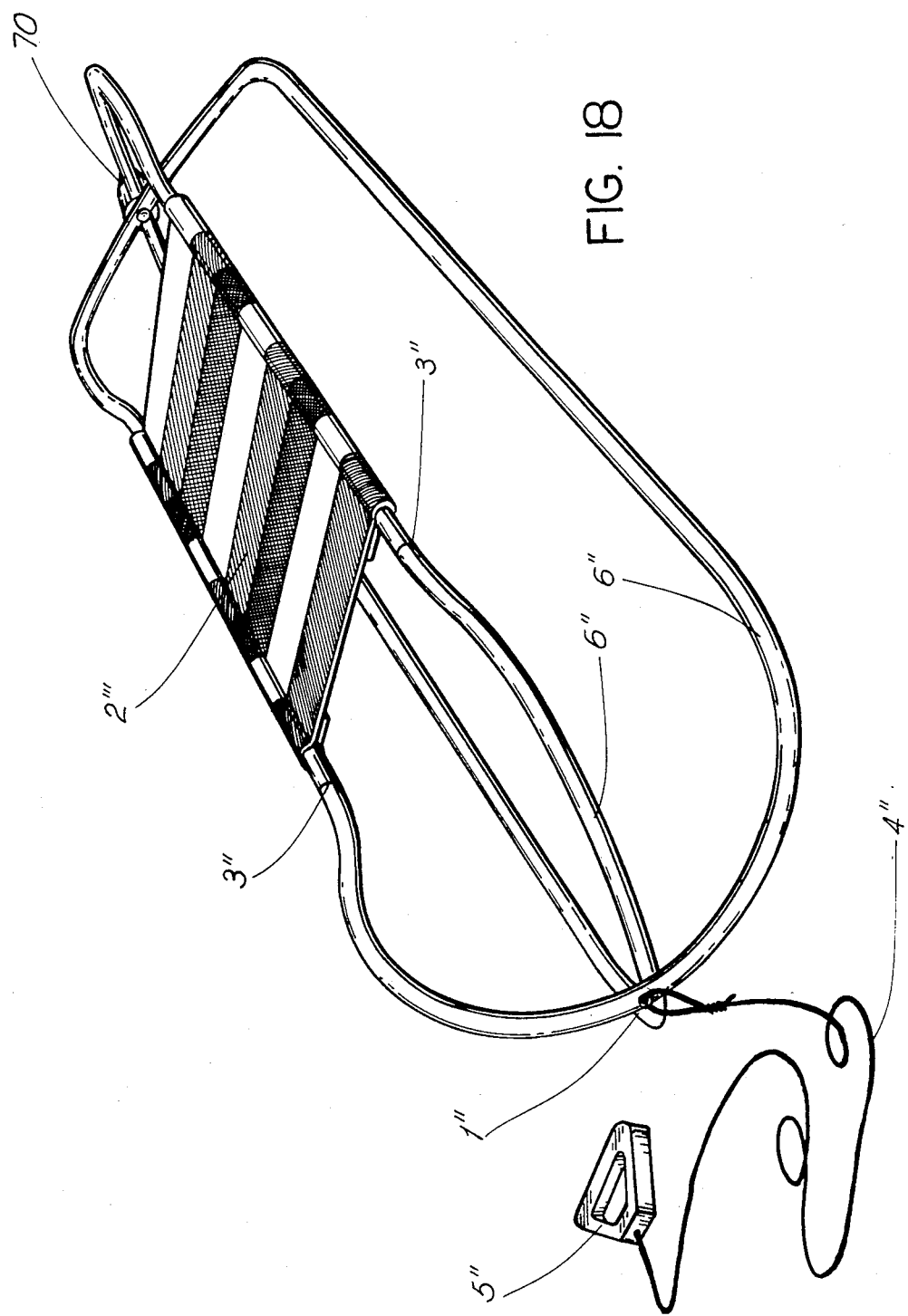
FIG. 18 is an overall perspective view of another, preferred embodiment of a sled with a safety fastener.

FIGS. 1, 13 and 18 show the sled according to this invention with all the parts thereof, i.e.: frames 6, fabric 2, rivets 1, rope 4 and anatomically designed handle 5.

Figure 3:
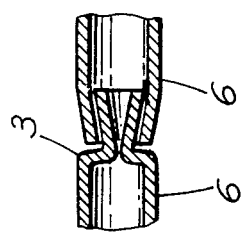
FIG. 3 is an enlarged, sectional side elevation of a connecting detail portion of the frame of FIG. 2.
Figure 2:
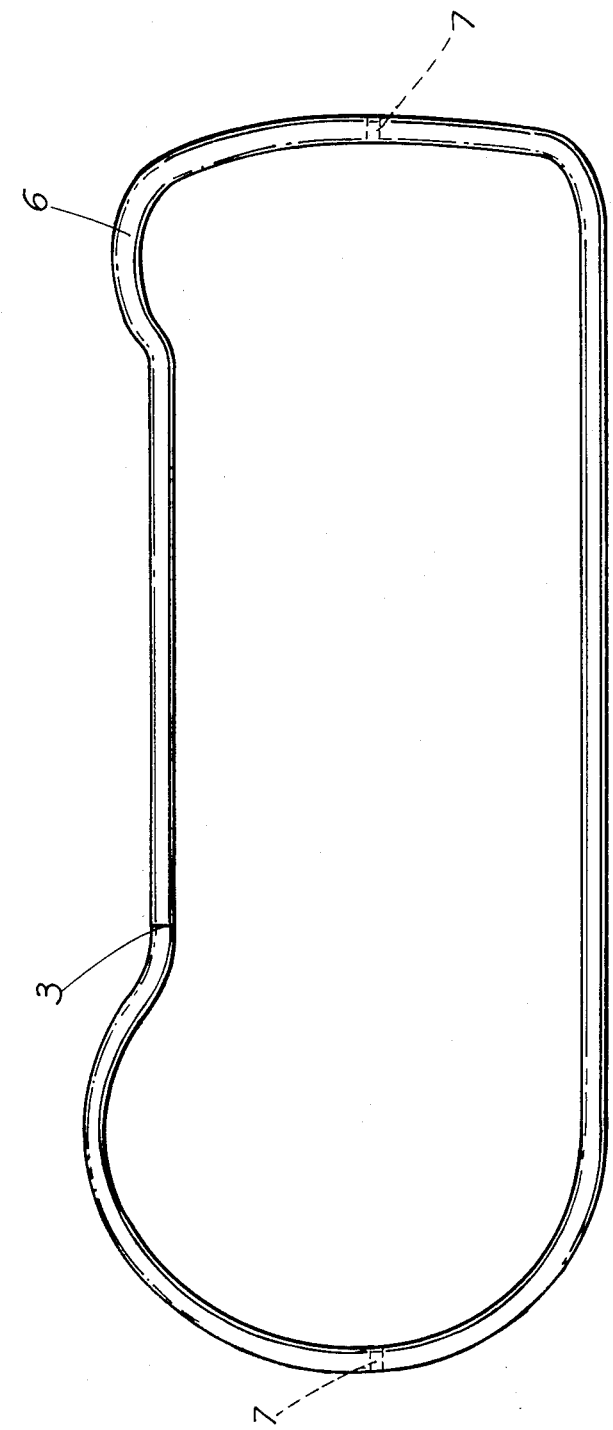
FIG. 2 is a side elevation of a frame of the sled of FIG. 1.

FIGS. 2 and 3 show the frame 6 with the detail of conical connection 3 and the holes 7.

FIGS. 4 and 5 show the rope 4 with the detail of connection thereof with the handle 5 and the rivet 1 positioned in the holes 7 in the frames 6.

Figure 8:
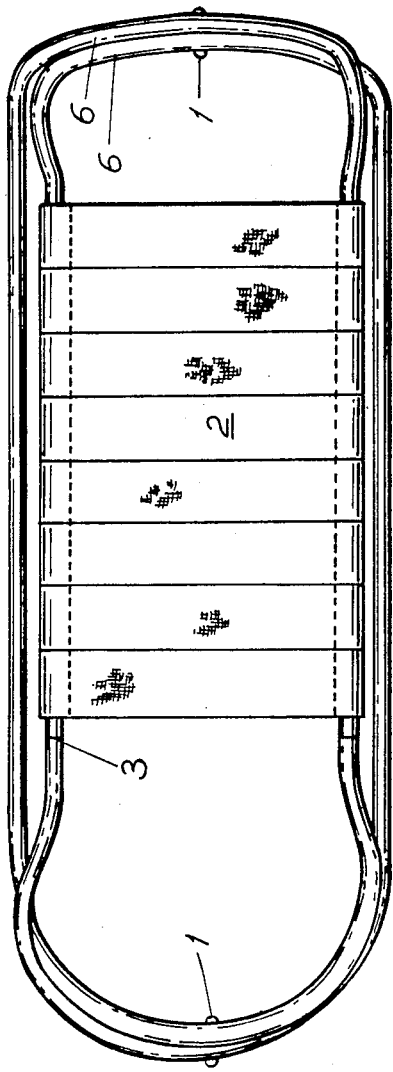
FIG. 8 is a plan view of the sled portion of FIG. 6.
Figure 6:
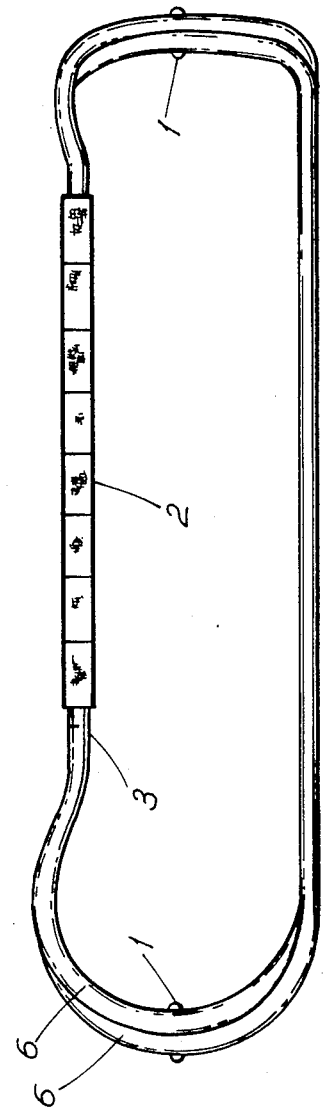
FIG. 6 is a side view of a sled portion the sled of FIG. 1.

FIGS. 6 and 8 show unfolded sled looking from above and from the side.

Figure 7:
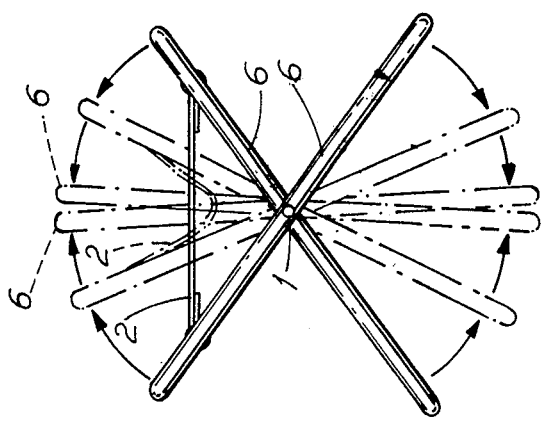
FIG. 7 is a front end view of the portion of FIG. 6 in unfolded, half-folded and folded positions.

FIG. 7 shows the sled in unfolded, half-folded and folded positions.

Figure 9:
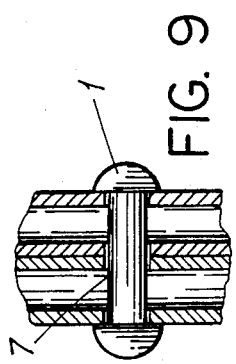
FIG. 9 is an enlarged plan view, partly in section, of two frames with rivet portion of the sled portion of FIG. 6.

FIG. 9 shows the detail of the two frames with the rivet in the holes in the frames.

Figure 12:
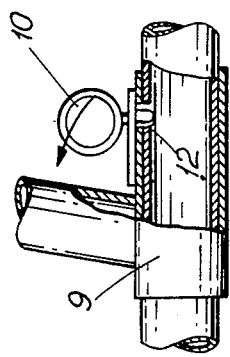
FIG. 12 is an enlarged side elevation, partly in section, of a handle portion of the frame of FIG. 10.
Figure 11:
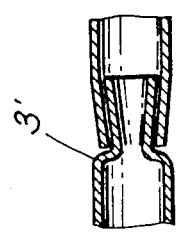
FIG. 11 is an enlarged, sectional elevation of a connecting detail portion of the frame of FIG. 10.
Figure 10:
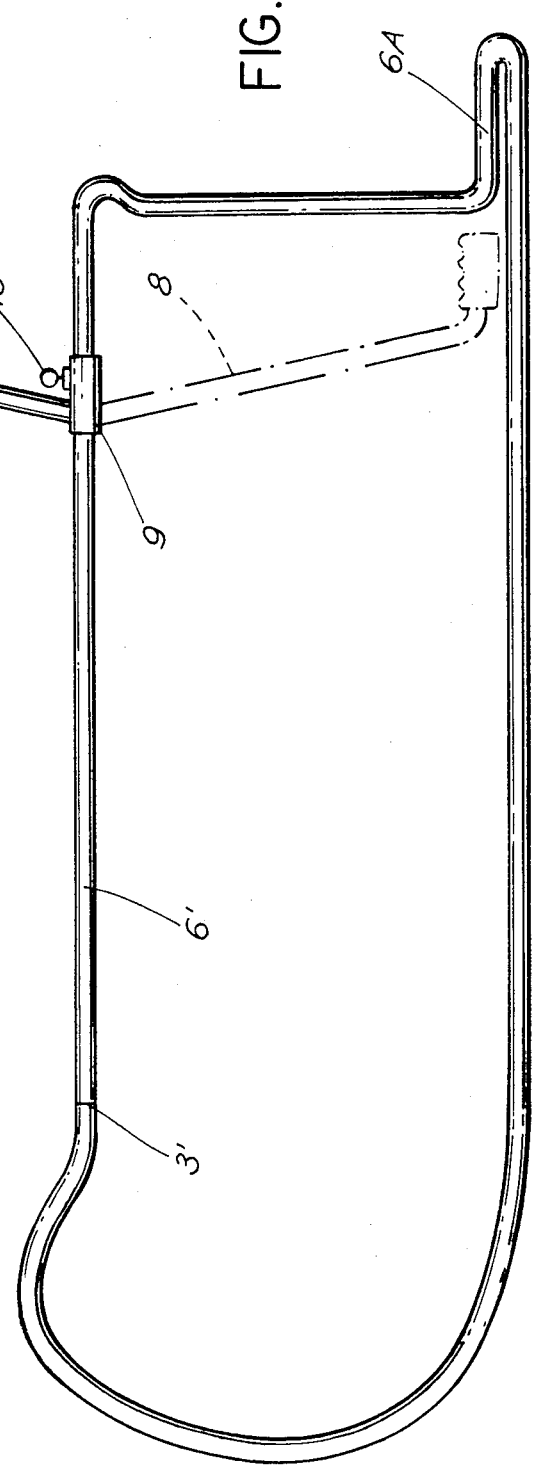
FIG. 10 is a side elevation of another, lengthened sled frame of another embodiment of a sled having a handle shown in two positions thereof.

FIGS. 10, 11 and 12 show the lengthened frame with the extension 6 A and the handle 8. The handle 8 is fixed to the tube 9 carrying the spring 12 and the handle 10.

FIG. 13 shows the sled with the additional parts as follows: handles 8, fabric 15, and clasps 14 for fastening the fabric for the handles. Extension for standing 6 A is also visible.

FIG. 14 shows the fabric fastening detail for the handle by the clasp 14.

FIG. 15 shows the sled looking from above with traced lines where the fabric is sewn 15.

FIG. 16 shows the lateral view of the sled.

FIG. 17 shows the sled in unfolded and partially folded position.

FIG. 18 is an overall view of the foldable sled including a safety fastener according to a preferred embodiment of this invention.

FIGS. 19, 20, and 21 are a view of the foldable sled with a safety fastener according to this invention from the three perpendicular sides.

Figure 22:
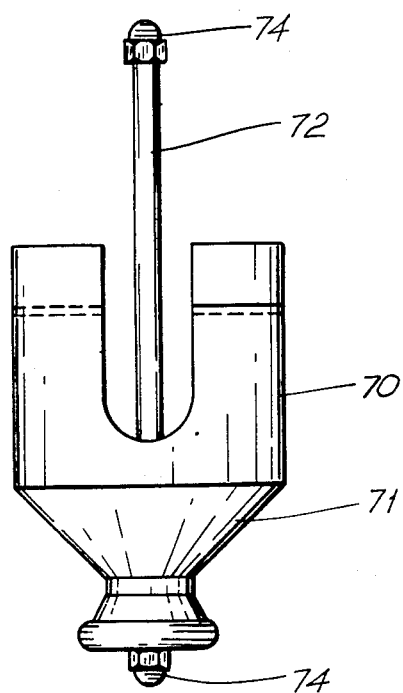
FIG. 22 is a plan view of the safety fastener portion of the sled of FIG. 18.
Figure 23:
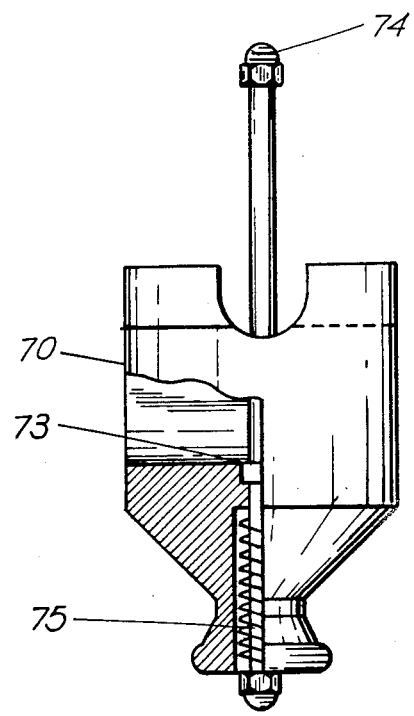
FIG. 23 is a plan view of the safety fastener portion of the sled of FIG. 18, partly broken away and partly in section.
Figure 24:
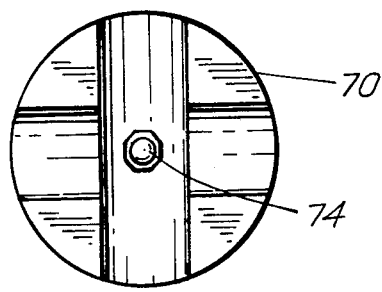
FIG. 24 is an end view of the safety fastener portion of the FIGS. 22 and 23.

FIGS. 22, 23 and 24 are a view of the safety fastener according to this invention from the three perpendicular sides, with a partial cut.

A foldable sled with a safety fastener according to a preferred embodiment this invention comprises two identical frames 6 rotatably connected in two points, i.e. in the front part by a rivet 1, and in the rear part by a safety fastener 70. The frames are made, for example, of aluminum alloy tubes, bended in a known or conventional way and connected at point 3. Fabric 2 is slipped over the frames, forming a seat and serving at the same time as a limiting device for unfolding the sled. Rope 4 is connected with a front rivet 1, having an anatomically shaped handle at the other end.

Safety fastener 70 comprises the body 71 made, for example, of plastic material, rod 72, threaded at both ends and having a thickened part 73 around the middle, blind nuts 74 threaded on the ends of the rod 72, and a spring 75.

Body 71 in one embodiment is essentially of cylindrical shape, with an axial hole, suited for insertion of the rod 72. In addition, there are two perpendicular transversal grooves with rounded bottoms, positioned at right angle to the axis of the body 71, which is at the same time the axis of the rod 72. The width of these grooves corresponds to the thickness (i.e., outer diameter) of the tube of which the frames 6 are made, while one of the grooves is deeper than the other for the outer diameter of the tubes. The above-mentioned axial hole has a part with smaller inner diameter, used for leaning one end of the spiral spring 75. The other end of the spring 75 rests on one of the blind nuts 74 at the end of the rod 72. The part of the rod 72 not passing through the spring 75 is used for connecting the frames 6, similarly to the rivet 1. This design ensures constant pressure forcing the body 71 to the frame 6, which why the protrusions, formed by cutting the grooves on the body 71, enter the space between the frames 6, when the sledge is unfolded, preventing the folding or collapse thereof. When the user wants to fold the sled, he has to pull the fastener 70, (i.e., body 71) out, pulling the protrusions out from the space between the frames 6, enabling the sled to be folded. With repeated unfolding, the safety fastener jumps into place without the action of the user, preventing desired folding.

It is obvious that, while producing the sled according to this invention, various changes are possible; for instance the body of the fastener can be variously formed to be suitable for handling, or some new slots can be carved in order to save in weight and/or material costs. That is why this invention can not be limited in any way by the example of a preferred embodiment described herein.

I claim:

1. A foldable sled comprising:

two frame members pivotally connected to each other at opposite ends swinging relative to each other from a sled-operative or open position into an inoperative or folded position, and vice versa;

handle means for a handle on each said frame member comprising a handle member and rotation means attaching each said handle member respectively to one said frame member for rotation around a longitudinal axis of at least a portion of said frame member and locking on said frame member in a predetermined position; and a piece of fabric attached to adjacent portions of said handle members for defining a backrest collapsibly movable within a plane substantially perpendicular to said longitudinal axis of said frame member.

2. A foldable sled according to claim 1 and further comprising a piece of fabric attached to adjacent portions of said frame members for defining a seat.

3. A foldable sled according to claim 1 wherein each said frame member comprises a cylindric tube and said rotation means further comprises a hollow cylindrical member permanently attached to said handle member and slidably positionable on said tube and means for fixing it in a position on said frame member.

4. A foldable sled with a safety fastener for holding the sled in unfolded condition, comprising:

two cylindrical frame members;

fasteners for rotatably connecting the frame members at two points on a longitudinal axis thereof for swinging relative each other from a sled-operative or open postion into an inoperative or closed position; and a fabric slipped over the frame members for forming a seat, wherein one of the fastener means comprises a rod (72) pivotally through each frame member and having to blind nuts (74) on opposite sides thereof, a body (71) receiving the rod (72) in an axial hole thereof, a spiral spring (75) slipped over the rod and resting with one end on one of the blind nuts (74) and with the other end on one end of the body (71), and two perpendicular grooves on the other end of the body at right angles to the rod the grooves having rounded bottoms and widths which correspond to the outer diameters of the cylindrical frame members for receiving them under urging from the spring.

* * * * *